(12) United States Patent
Maroney et al.

(10) Patent No.: US 8,683,123 B2
(45) Date of Patent: Mar. 25, 2014

(54) CLUSTERED STORAGE NETWORK

(75) Inventors: John E. Maroney, Irvine, CA (US);
Tridib Chakravarty, Long Beach, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 13/585,586

(22) Filed: Aug. 14, 2012
(Under 37 CFR 1.47)

(65) Prior Publication Data
US 2012/0331086 A1 Dec. 27, 2012

Related U.S. Application Data

(63) Continuation of application No. 13/164,070, filed on Jun. 20, 2011, now Pat. No. 8,266,376, which is a continuation of application No. 11/944,303, filed on Nov. 21, 2007, now Pat. No. 7,991,951.

(60) Provisional application No. 60/860,558, filed on Nov. 22, 2006.

(51) Int. Cl.
*G06F 12/00* (2006.01)

(52) U.S. Cl.
USPC ............................................. 711/114

(58) Field of Classification Search
None
See application file for complete search history.

(56) References Cited

U.S. PATENT DOCUMENTS

| | | | |
|---|---|---|---|
| 7,549,018 B2 | 6/2009 | Islam et al. | 711/114 |
| 7,584,325 B2 | 9/2009 | Holland et al. | 711/114 |
| 2007/0226415 A1 | 9/2007 | Holland et al. | 711/114 |
| 2008/0040564 A1 | 2/2008 | Kubo et al. | 711/154 |
| 2008/0098321 A1* | 4/2008 | Krithivas | 715/771 |
| 2009/0198888 A1* | 8/2009 | Mannen et al. | 711/114 |

\* cited by examiner

*Primary Examiner* — Brian Peugh
(74) *Attorney, Agent, or Firm* — Baker Botts L.L.P.

(57) ABSTRACT

A data storage network is provided. The network includes a client connected to the data storage network; a plurality nodes on the data storage network, wherein each data node has two or more RAID controllers, wherein a first RAID controller of a first node is configured to receive a data storage request from the client and to generate RAID parity data on a data set received from the client, and to store all of the generated RAID parity data on a single node of the plurality of nodes.

18 Claims, 7 Drawing Sheets

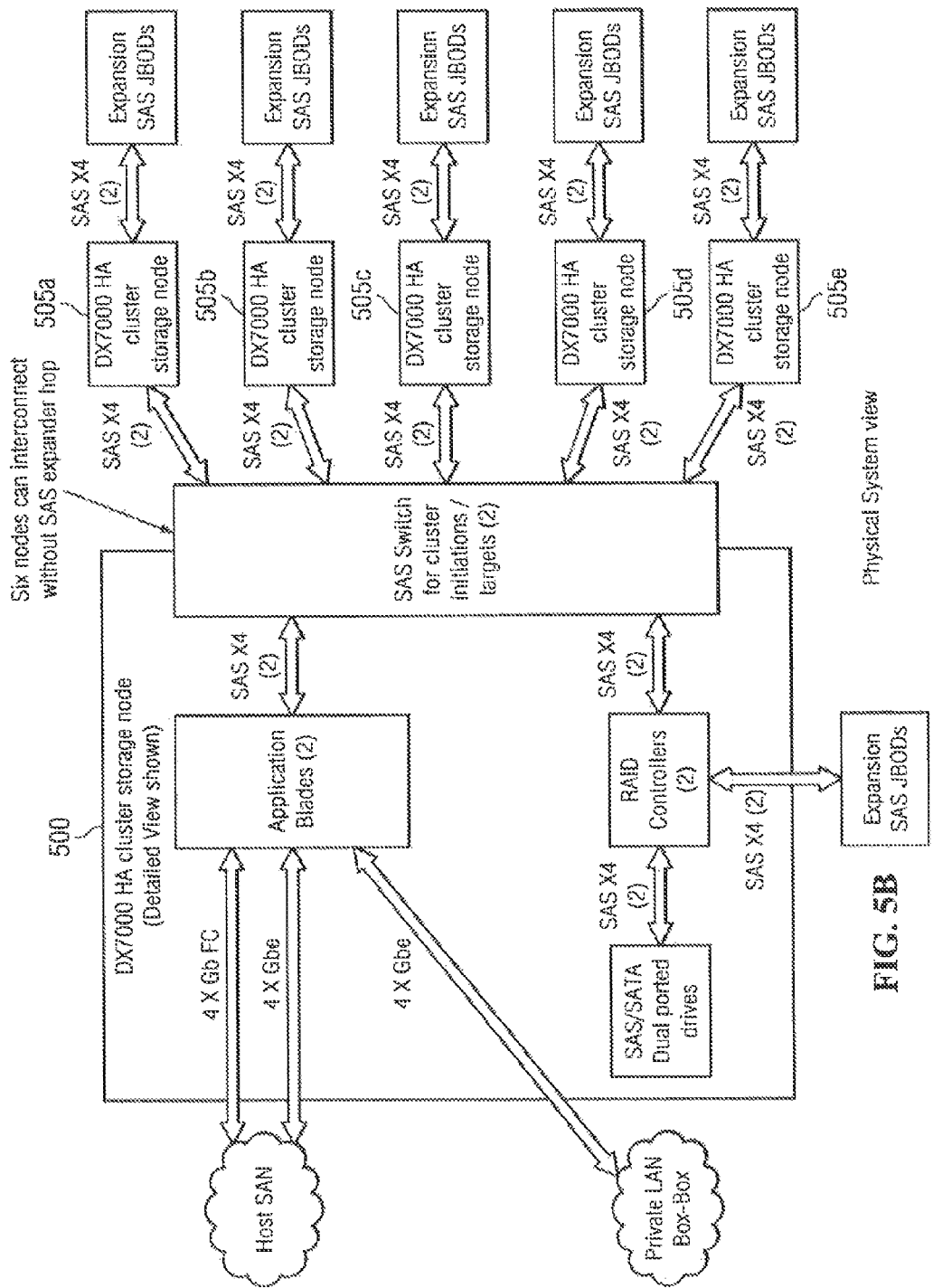

CLUSTERED STORAGE NETWORK

RELATED APPLICATIONS

This application is a continuation application of U.S. application Ser. No. 13/164,070, filed on Jun. 20, 2011, now U.S. Pat. No. 8,266,376, which claims priority to U.S. application Ser. No. 11/944,303, filed on Nov. 21, 2007, now U.S. Pat. No. 7,991,951, which claims priority to U.S. Provisional Application Ser. No. 60/860,558, filed on Nov. 22, 2006, which is incorporated by reference herein in its entirety.

TECHNICAL FIELD OF THE INVENTION

The present invention relates to network storage, and more particularly, some embodiments relate to a clustered storage network.

BACKGROUND OF THE INVENTION

There are typically three classes of storage system, low, mid and high (enterprise system). Components used in each of these classes of storage system can greatly vary in performance, cost, and functionality. This is attributed largely to differing requirements between each of the classes. Generally, low end systems use cheaper components than their high-end counterparts and do not offer component redundancy. Enterprise systems on the other hand use more expensive components and exhibit component redundancy, which provides higher reliability. Typically, low-end storage systems do no share common components with high-end systems. Low-end storage systems use different chassis, power supplies, fans, RAID controllers, application motherboards/HBAs blades, drive sleds, switches, etc.

Enterprise storage systems typically have a number of different building blocks, interconnect cables, field replaceable units (FRUs), system setup/configuration, and troubleshooting. Additionally, enterprise storage systems typically include integral switches for scalability and double the components for redundancy, and are generally not built with the same common components as low-end platforms.

SUMMARY OF THE INVENTION

The present invention is directed to systems and apparatus for data storage. Some embodiments relate to a data storage network that includes a client connected to the data storage network; a plurality nodes on the data storage network, wherein each data node has two or more RAID controllers, wherein a first RAID controller of a first node is configured to receive a data storage request from the client and to generate RAID parity data on a data set received from the client, and to store all of the generated RAID parity data on a single node of the plurality of nodes.

In one embodiment, each data node further comprises two or more motherboards and the first RAID controller comprises a serial attached small computer system interface (SAS) RAID controller.

In yet another embodiment, each RAID controller is located on a separate application blade, wherein each application blade is coupled to a storage device.

In still another embodiment, each node further comprises a plurality of storage devices.

In accordance to another embodiment of the present invention, a data storage system includes a first and second RAID controllers being in communication with each other; a first and second motherboards, the first motherboard being coupled to the first RAID controller, and the second motherboard being coupled to the second RAID controller; and a first switch coupled to the first RAID controller and a first storage unit; a second switch coupled to the second RAID controller and to the first storage unit, wherein the first RAID controller is configured to receive a data storage request and to write data to the first storage unit based on the data storage request.

In yet another embodiment, the RAID controller comprises a serial attached SCSI (SAS) RAID controller.

In still another embodiment, the first switch is a SAS switch. In still another embodiment, a third SAS switch is coupled between the first switch and the first RAID controller, and a fourth SAS switch being coupled between the second switch and the second RAID controller.

In still another embodiment, a third SAS switch is coupled between the first RAID controller and the first motherboard, and a fourth SAS switch being coupled between the first RAID controller and the first motherboard.

In still another embodiment, the third SAS switch comprises a cluster initiator/targets.

In accordance to another embodiment of the present invention, a data storage network comprises a first node that includes a first and second RAID controllers being in communication with each other; a first and second motherboards, the first motherboard being coupled to the first RAID controller, and the second motherboard being coupled to the second RAID controller; and a first switch coupled to the first RAID controller and a first storage unit; a second switch coupled to the second RAID controller and to the first storage unit, wherein the first RAID controller is configured to receive a data storage request and to write data to the first storage unit based on the data storage request; and a second node comprising: a third and fourth RAID controllers being in communication with each other; a third and fourth motherboards, the third motherboard being coupled to the third RAID controller, and the fourth motherboard being coupled to the fourth RAID controller; and a third switch coupled to the third RAID controller and a second storage unit; a fourth switch coupled to the fourth RAID controller and to the second storage unit, wherein the third RAID controller is configured to receive a data storage request and to write data to the first storage unit based on the data storage request.

In accordance to yet another embodiment of the present invention, a data storage network is provided. The data storage network includes a client connected to the data storage network; a plurality nodes on the data storage network, wherein each data node has a plurality of storage devices, a data controller configured to receive a data storage request from the client.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

The present invention is directed toward a data storage network system and method. More particularly, some embodiments relate to a scalable clustered storage network with locally implemented RAID (redundant array of independent disks) capability.

Figure 1:
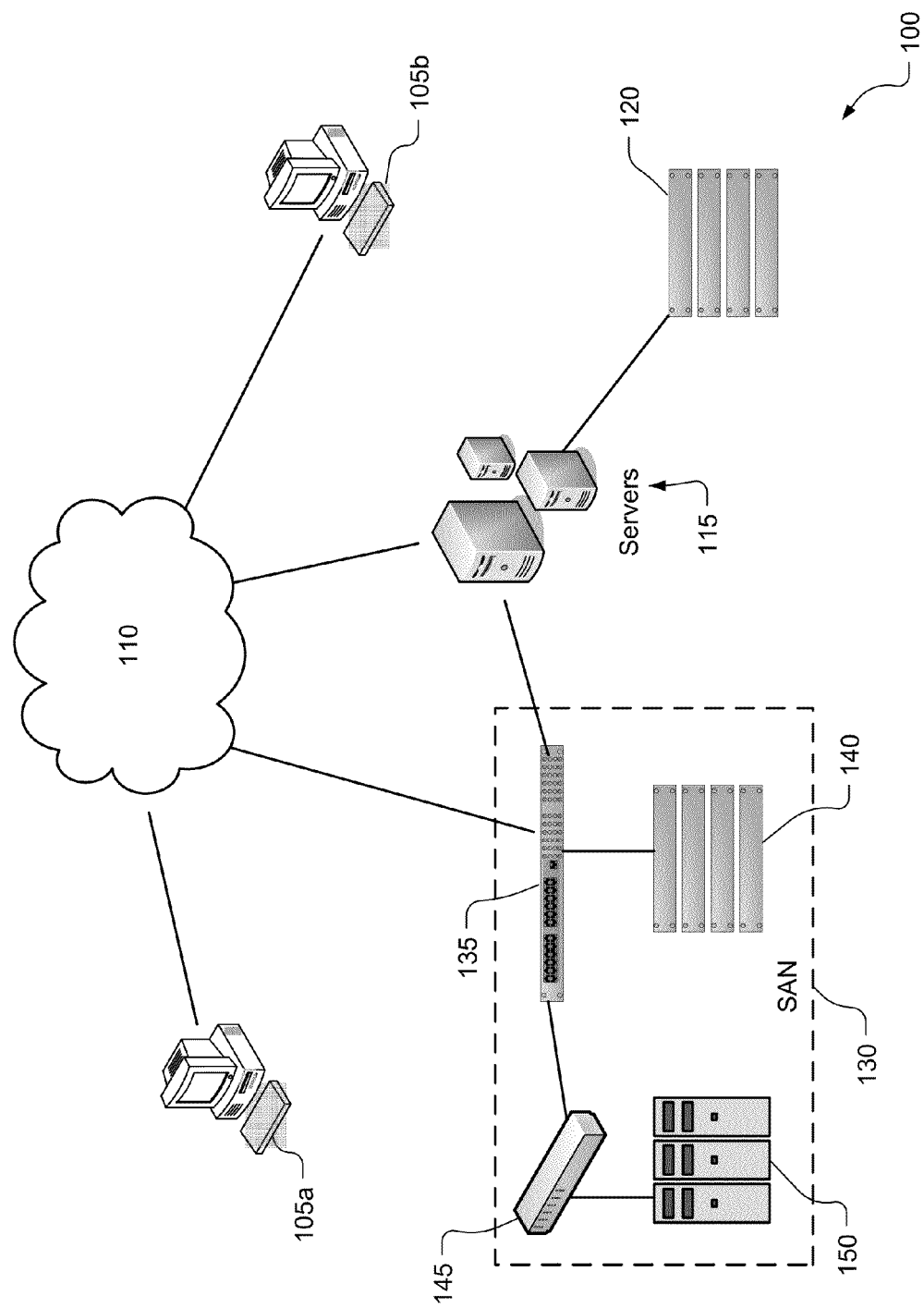
FIG. 1 illustrates an example environment in which the invention can be implemented according to one embodiment of the present invention.

Before describing the invention in detail, it is useful to describe an example environment with which the invention can be implemented. FIG. 1 illustrates a data storage system 100 with which the present invention can be implemented. System 100 in the illustrated example includes computing devices 105a-b, a network 110, a server 115, an array of storage disk 120, and a storage area network 130. Computing devices 105a-b can any of a variety of computing devices including, for example, laptops, desktops, workstations, personal digital assistants (PDAs), handheld computing devices, or other types of computing devices.

Network 110 can be implemented using any of a variety of network architectures or topologies. Such networks might include, for example, the internet, a local area network (LAN), a wide area network (WAN), a plain old telephone system (POTS), or any other suitable network or communications channel. As shown, computing devices 105a-b and server 115 are connected to network 110. The connection to network 110 can be wireless or through a wired connection.

Server 115 can be any server system such as, for example, a conventional standalone file server configured to provide data services to a client device such as device 105a. Server 115 can be scalable to increase storage capacity such as, for example, by adding storage disk array 120. Disk array 120 can be implemented as, for example, a direct-attached storage (DAS system). In the example architecture illustrated in FIG. 1, system 100 includes SAN 130, which includes switch 135, disk array 140, router 145, and a tape server 150. Server 115, disk array 120, and SAN 130 can be implemented using one or more types of storage architectures such as, for example, small computer system interface (SCSI), serial advanced technology attachment (SATA), serial attached SCSI (SAS), or fiber channel (FC).

Generally, a legacy SCSI system with an 8:-bit wide bus can typically deliver data at a rate of approximately 5 megabits per second (MBps), whereas contemporary 16-bit wide bus SCSI systems can deliver data up to 320 MBps. Typical SATA systems are generally less expensive than an equivalent SCSI system and can provide performance close to that of the 16-bit wide bus SCSI system at 300 MBps.

FC systems are common and more widely used than SATA and SCSI systems. FC systems offer several advantages such as pooled resources, flexible backup capability, scalability, fast data transfer (up to 512 MBps), and the ability to accommodate long cable lengths. FC systems may have cable lengths up to 10 kilometers as compared to a maximum cable length of 25 meters for other system such as, for example, a SCSI system.

With continued reference to FIG. 1, the illustrated exemplary system 100 can provide data access and storage redundancy by storing data at multiple locations such as server 115, disk arrays 120 and 140, or tape server 150. Server 115 can be groups of remote servers, each group may be locally or remotely connected with other groups via a network similar to network 110. As shown in FIG. 1, server 115 may access data or backup data to disk array 140 or tape server 150 through network 110 or via a direct connection to switch 135. In this way, server 115 has the flexibility of accessing array 140 or tape server 150 via multiple connections and thereby avoids network bottlenecks.

In one embodiment, switch 135 is an FC data switch and tape server 150 is SCSI type server. In this embodiment, router 145 is configured to transfer data between a FC data bus of FC switch 135 and a SCSI bus of SCSI tape server 150. Although a specific architecture is described above, components of SAN 130 may have a different architecture or combination of architectures such as, for example, SATA, SAS, and FC.

In system 100, data redundancy can be implemented in SAN 130 by implementing RAID across disk array 140 and tape 150. Parity data needed for reconstructing a failed data sector can be distributed by a RAID controller (not shown) located in SAN 130, across array 140, or separately to tape server 150, or across both array 140 and tape server 150. In this setup, clients 105a-b typically can not access data stored within SAN 130 network when a critical component (e.g., motherboard, switch 135, power supply, etc.) of node 130 fails.

From time to time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Figure 2:
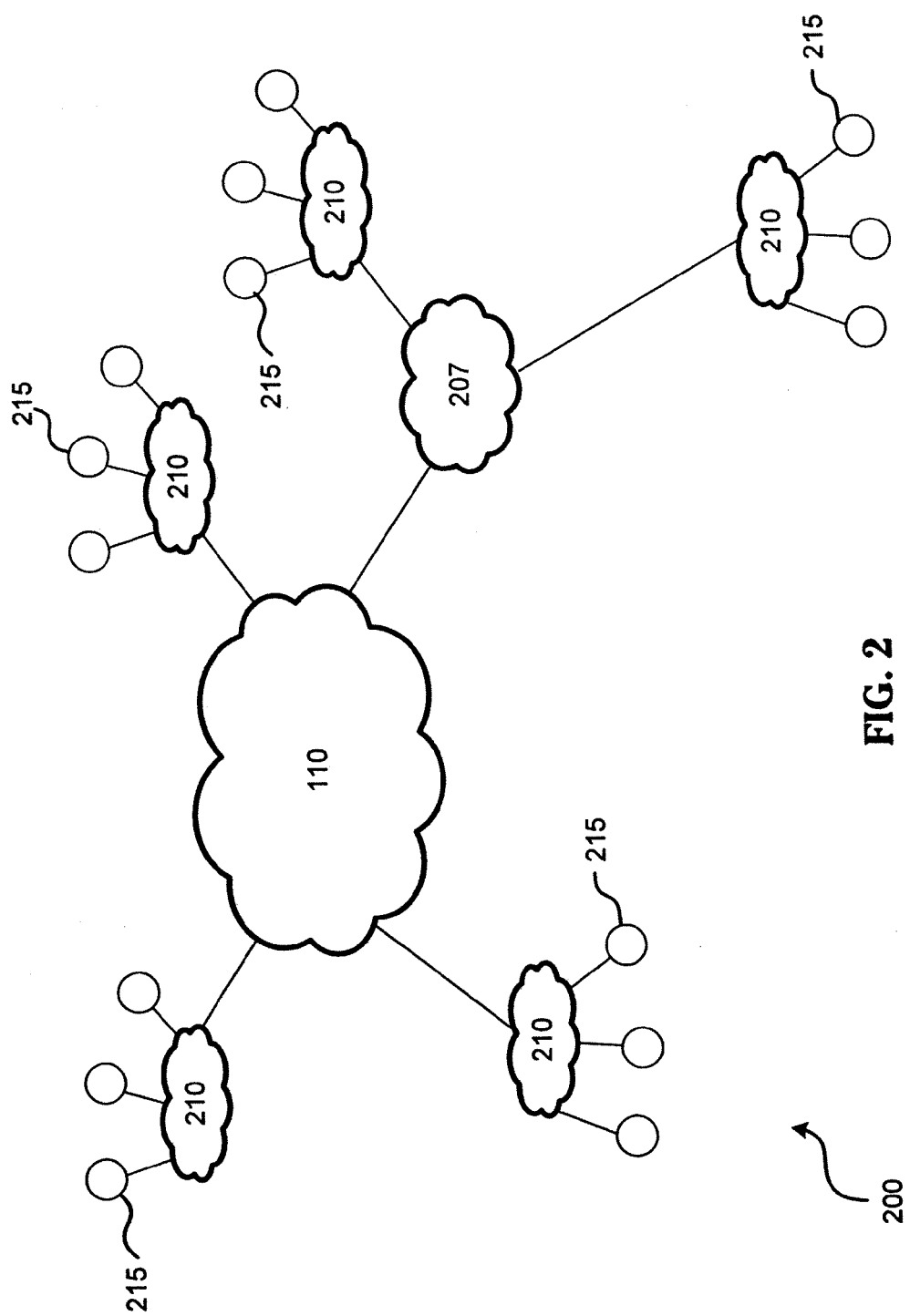
FIG. 2 illustrates an example network in which the invention can be implemented according to one embodiment of the present invention.

FIG. 2 illustrates an example data network 200 in which the present invention may be implemented. Referring now to FIG. 2, data network 200 includes network 110 and sub-networks 210. Similar to network 110, network 210 can be a wide-area network (WAN), a local area network (LAN), or other communication network or channel. As shown, connected to each data network 210 are data nodes 215 that may be implemented, individually or collectively, as a storage network having an architecture similar to server 115, SAN 135, or redundant array of independent nodes (RAIN).

RAIN is a cluster of nodes used to increase fault tolerance. In RAIN, RAID is implemented across the nodes of the network rather than across an array of disks as in SAN 130. Generally, RAIN is flexible and the number of nodes that can be part of the RAID network can be high. However, as the number of RAID nodes increases, the RAID distribution process gets further bogged down. Additionally, each node in the RAIN network is typically not redundant (non-HA), meaning the node itself has no internal fail-over capability. Once a node dies in a RAIN network, parity data stored in that node must be retrieved at a different node with identical parity data. If there is no other node that contains the identical parity data, then data will be lost.

With continued reference to FIG. 2, in one embodiment, node 215 is implemented as a node of a redundant array of redundant nodes (RARN) network. In this embodiment, each node 215 of RARN network 200 is a redundant or HA node that includes redundant critical components such as, for example, motherboards, RAID controllers, and dual ported storage devices. In this way, each node has an internal failover capability. Additionally, because a RARN node has multiple motherboards, RAID controllers, and storage devices, there is no need to generate RAID or parity data and distribute them across all of the nodes. In one embodiment, RAID parity data are distributed among the storage devices within a single RARN node. This allows network 200 to operate more efficiently and faster.

Figure 3:
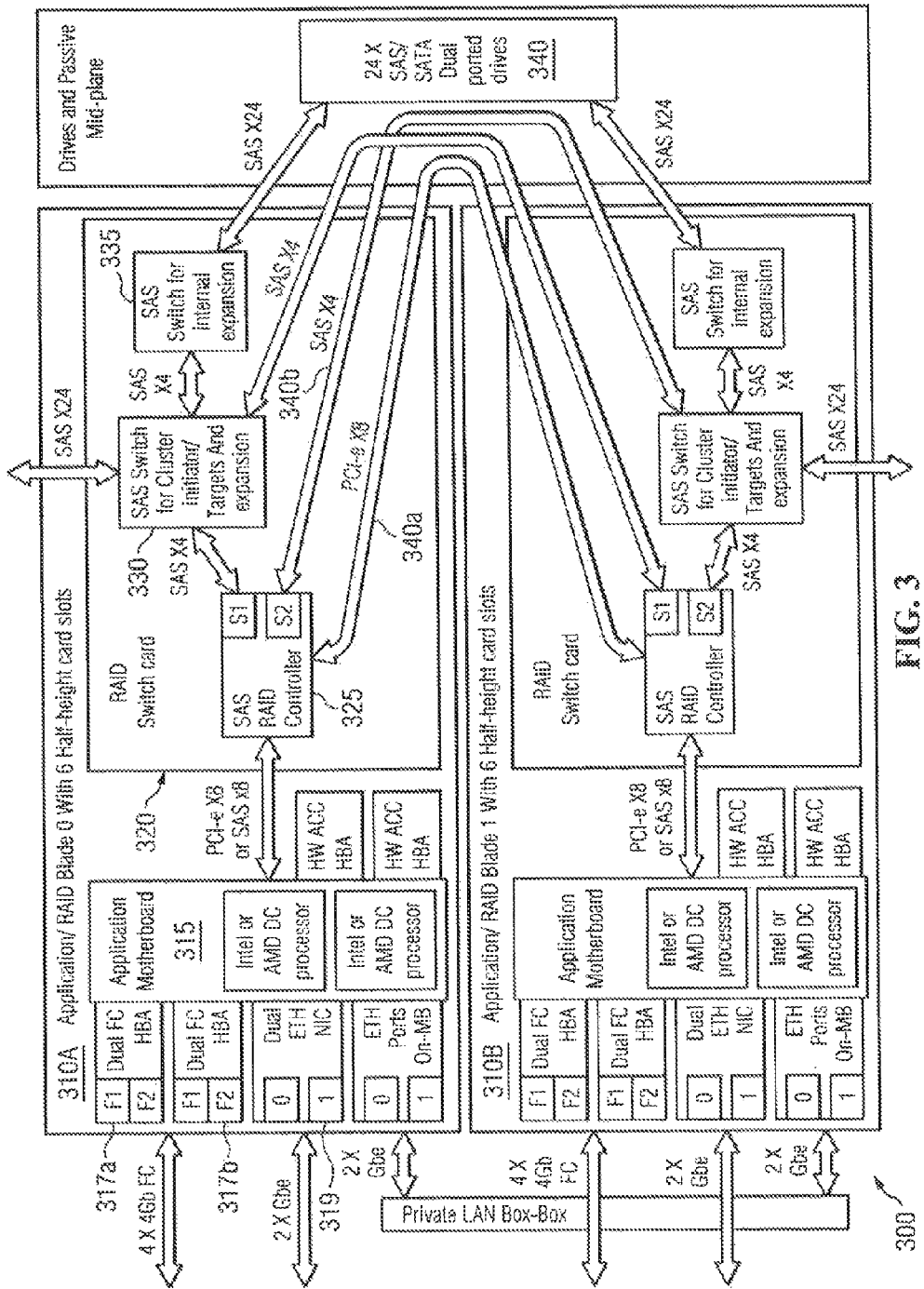
FIG. 3 illustrates an example redundant array of redundant nodes (RARN) architecture.

FIG. 3 illustrates an example RARN architecture 300 according to one embodiment of the present invention. Referring now to FIG. 3, RARN architecture or system 300 includes two RAID blades 310a and 310b. In this way, each blade serves as a fail-over pair for the other blade. Although a two-RAID blade architecture is shown, more than two RAID blades can be used and is contemplated. In the illustrated example, blades 310a and 310b are identical.

As shown in FIG. 3, the blades 310 in this example include a motherboard 315, two dual fibre channel host bus adapters 317a-b, a dual Ethernet network interface card 319, and a RAID switch card 320. Motherboard 315 includes two central processing units 316a and 316b. RAID switch card 320 is connected to motherboard 315 via a bus such as, for example, a PCI-express bus having an 8-bit width or a SAS (serial attached SCSI) bus having an 8-bit width. RAID switch card 320 includes a SAS RAID controller 325, a SAS switch 330 for cluster initiator/targets and expansion, and a SAS switch 335 for internal expansion. As shown, SAS switch 335 is coupled to a storage device 340. In one embodiment, storage device 340 is a SATA (serial advanced technology attachment) dual ported drives.

System 300 can be implemented in a number of configurations. For example, in one embodiment, system 300 can be implemented in a 4U (dual, redundant blade) form factor chassis for an enterprise version. As another example, system 300 can be implemented in a 2U single form factor chassis with a hot swappable interface for a low-end version. In system 300, application heads might be combined, meaning RAID disk array, SAS clustering, and expansion backend data switches into a single storage application platform node. No additional hardware (HW) components are required to cluster storage application platforms or add JBODs Gust a bunch of disks) for capacity expansion, which can be done by connecting boxes together and adding chassis or blades to order.

The illustrated example also allows system 300 to support dual redundant application RAID blades with active/active cache coherency and to have interchangeable Application/RAID blades or JBOD controller blades.

In one embodiment, SAS switch 330 includes integrated 6 (X4) port SAS I/O data switches. This allows switch 330 to support box-to-box shared target/initiator clustering. In one embodiment, SAS switch 335 is an integrated 2 (X4) port SAS I/O data switches to support internal drives and for external JBODs expansion.

In one embodiment, system 300 is configured to operate with high availability and failover on both a hardware level and an application level. In this way, an exemplary VTL (virtual tape library) blade that fails can be picked up by a secondary VTL blade and carry on. System 300 can also be configured to run a number of different applications in order to implement various data storage architectures such as, for example, VTL, NAS (network attached storage), and CDP (continuous data protection), using similar hardware and common components. In one embodiment, the RAID controller of each blade communicates with other RAID controller of system 300 using communication buses 340a-b.

In one embodiment, system 300 uses either a native X8 SAS or PCI-e RAID controller to directly connect to the application motherboard/HBAs. As shown in FIG. 3, SAS RAID controller 325, in turn, connects to SAS data switch 330 to initiator/target box to box clustering and internal/external drive expansion. This architecture has a cost advantage over other similar platform.

Switch 330 is a combined function switch and might be zoned in such a way that other initiators on the cluster cannot see the drives owned by each RAID controller. Accordingly, in one embodiment switch 330 is configured with two separate zones. In general, SAS addressing has a practical limit of 1024 device addresses, divided by two for redundancy. Since RAID controller 325 sees both the drives and external boxes with the same ports, its overall addressing capacity to other boxes might be reduced by the number of drives it owns locally. RAID controller 325 also shows a PCI express connection between the two controllers for cache coherency; however, this could also be a SAS bus or some other high bandwidth communication bus.

In one embodiment, RAID controller 320 is configured to perform RAID 5, 6, 10, 1, 0, 50 functions. In exemplary system 300, the target/initiator SCSI CDB-level provides access to RAID logical volumes, and other non-disk logical units, such media changers or tape drives. The exemplary system 300 also has the ability to support failover across redundant controllers. When the write cache is enabled, it is necessary to keep the cache synchronized across redundant controllers. Additionally, system 300 has the ability to "shut off" a working controller with which we cannot communicate (e.g. bad cable). In one embodiment, RAID controller 320 is configured to generate RAID parity data for a received data set and distribute the RAID parity data among one or more storage drives within system 300. Preferably, RAID controller 320 is configured to keep all of the RAID parity data within the node, meaning no parity data are sent to other nodes.

In exemplary system 300, the SAS JBOD controller blades have the same form factor and interchangeable with application RAID blades. Fan and power supply modules are also configured in single or double (redundant) configurations. Drives and drive sleds with dual SAS/SATA can be used to access the drives as normal. Additionally, system 300 includes an integrated 6 (X4) port SAS I/O data switch modules for SAS initiator/target clustering allows any to any connectivity between the storage platforms, as shown in FIG. 3.

Figure 4:
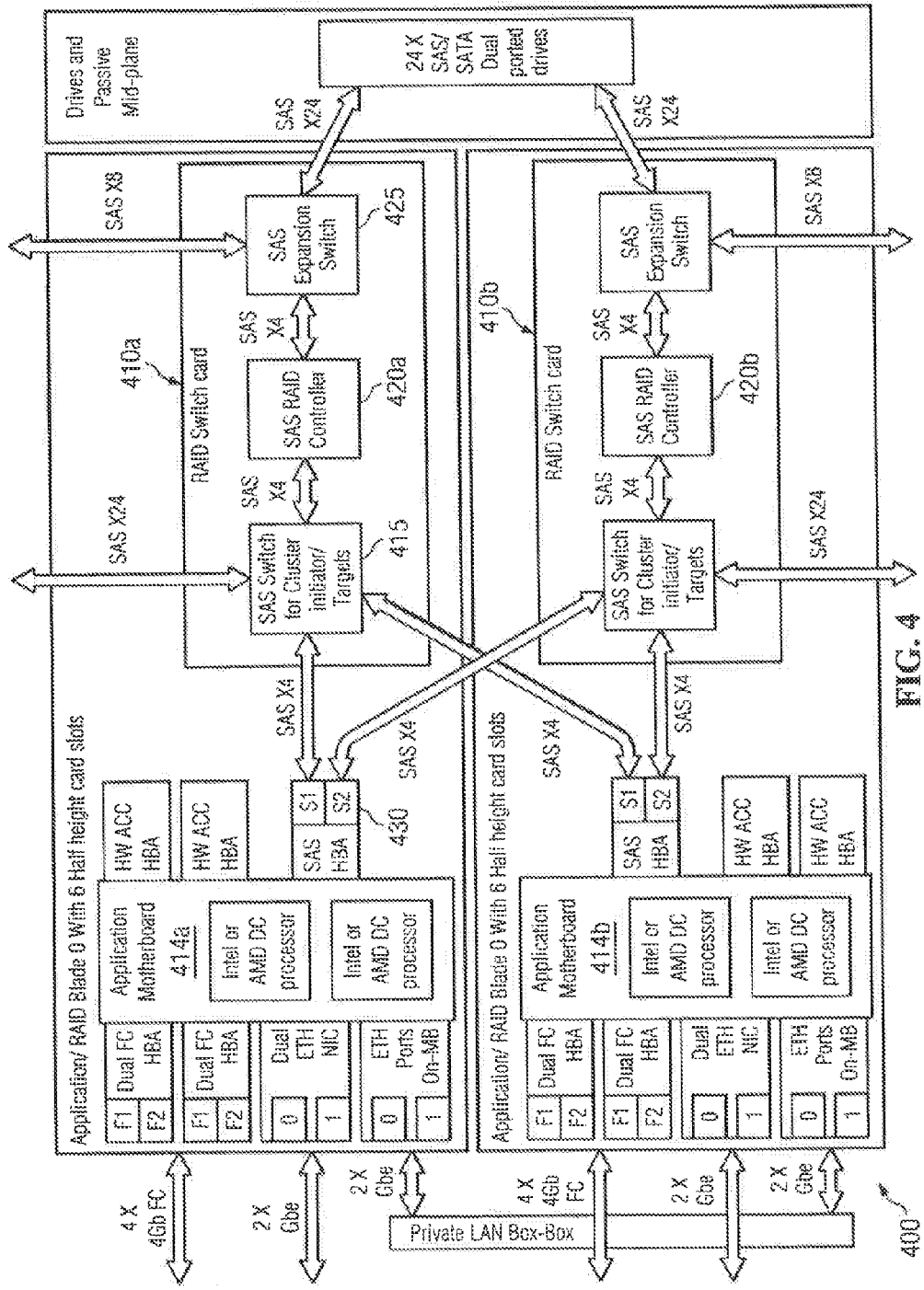
FIG. 4 illustrates an example blade system of a RARN node.

FIG. 4 illustrates a blade system 400 of a RARN node according to one embodiment of the present invention. System 400 in the illustrated example is similar to the example of system 300 and may incorporate some or all features of system 300. Referring now to FIG. 4, system 400 includes RAID switch cards 410a-b. Each card 410 has a SAS switch 415, a SAS RAID controller 420, and a SAS expansion switch 425. As shown in FIG. 4, SAS RAID 420a is coupled between SAS switch 415 and SAS switch 425. In this embodiment, RAID switch card 410 is coupled to motherboard 414 via a SAS host bus adapter 430.

In one embodiment, one of the RAID controllers 420*a-b* is configured to generate RAID parity data for a received data set and distribute the RAID parity data among one or more storage drives within system 400. Preferably, RAID controller 420 is configured to keep all of the RAID parity data within the present node, meaning no parity data are sent to other nodes.

In one embodiment, system 400 uses a PCI-e to SAS HBA bus system to connect to its local and companion SAS data switches for initiator/target box-to-box clustering and failover. This data switch is connected to SAS to SAS RAID controller 420 as a target and exposes 6 (X4) SAS ports externally to other boxes. SAS RAID controller 420 also has a port (not shown) to act as RAID initiator to only the internal drives and external JBODs through a separate SAS data expansion switch. Two separate switches preclude the use of zoning and allows for the full addressing space for external boxes and local SAS device addressing, basically, giving system 400 maximum clustering and drive expansion capability.

Figure 5A:
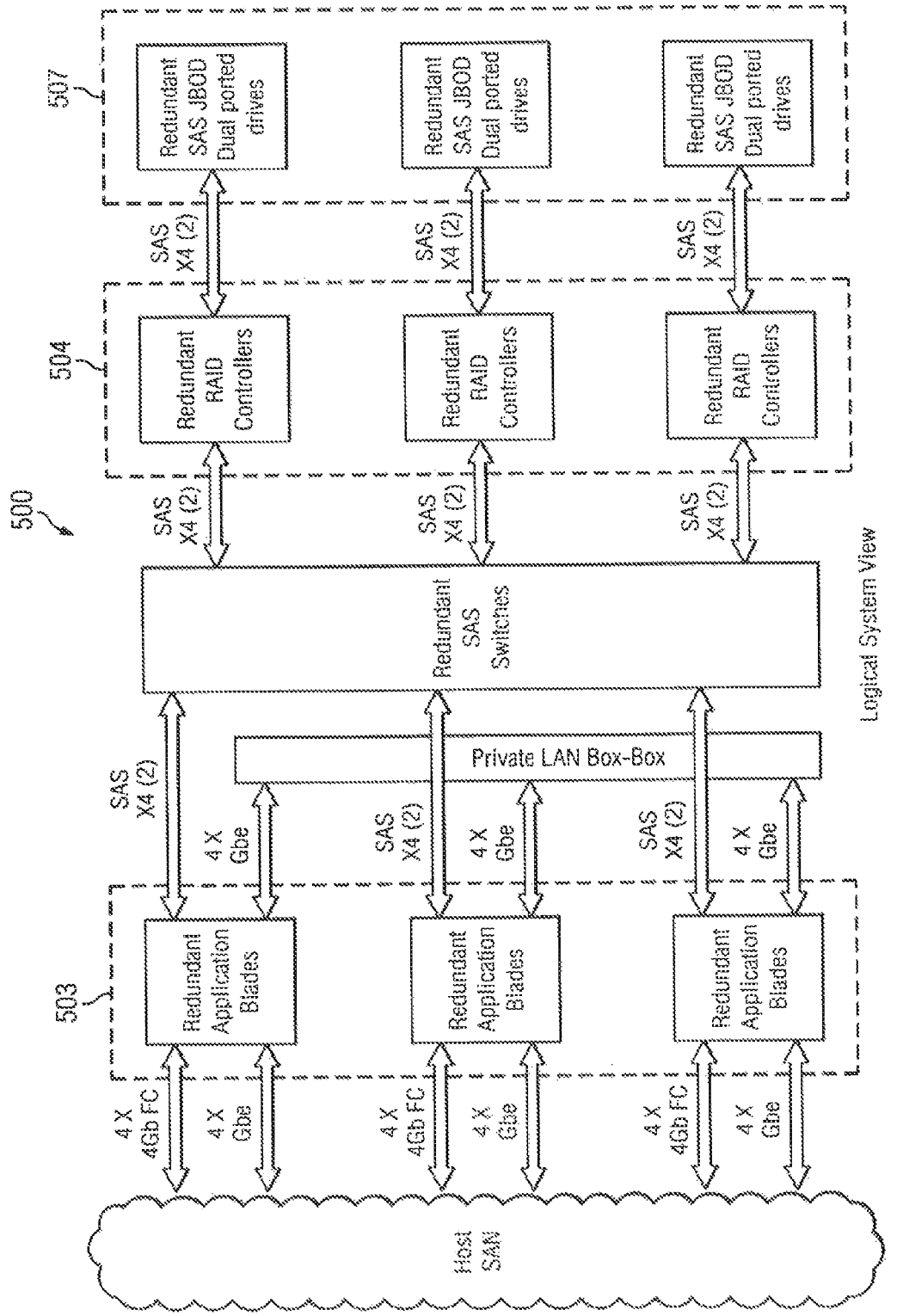
FIGS. 5-6 illustrate example systems of a node in a redundant array of redundant nodes (RARN) network according to embodiments of the present invention.

FIG. 5A illustrates a logical system view of a RARN node 500 according to one embodiment of the present invention. Referring now to FIG. 5A, RARN node 500 in this example includes three application blades 503, three RAID controllers 504, and three dual ported drives 507 to provide node 500 with data storage redundancy. According to one embodiment, RAID controllers of RARN node 500 do not generate and distribute parity data across all of the nodes that belong to the RARN network. Instead, in this embodiment, RAID parity data are generated and distributed to and maintained by storage drives within RARN node 500.

FIG. 5B illustrates a physical system view of an example of a RARN node 500 connected to other RARN nodes 505*a-e* in accordance with one embodiment of the invention. In one embodiment, node clusters 505*a-e* work in concert with software application built into each node or in one embodiment built into one of the RAID controller to provide fault tolerance. If one blade fails, the other blade can pick up where the first blade left off. In one embodiment, each blade is running a cluster FS client. This cluster FS client can be configured to virtualize the storage on that box and works with the cluster FS client on the other boxes to present a single common storage pool.

In one embodiment, the pool presents a unified view of all data in the cluster. Accordingly, a file written on one box can be retrieved from another. Further, a cluster FS gives us data coherency, metadata management and access co-ordination (e.g. Stornext FS).

Figure 6:
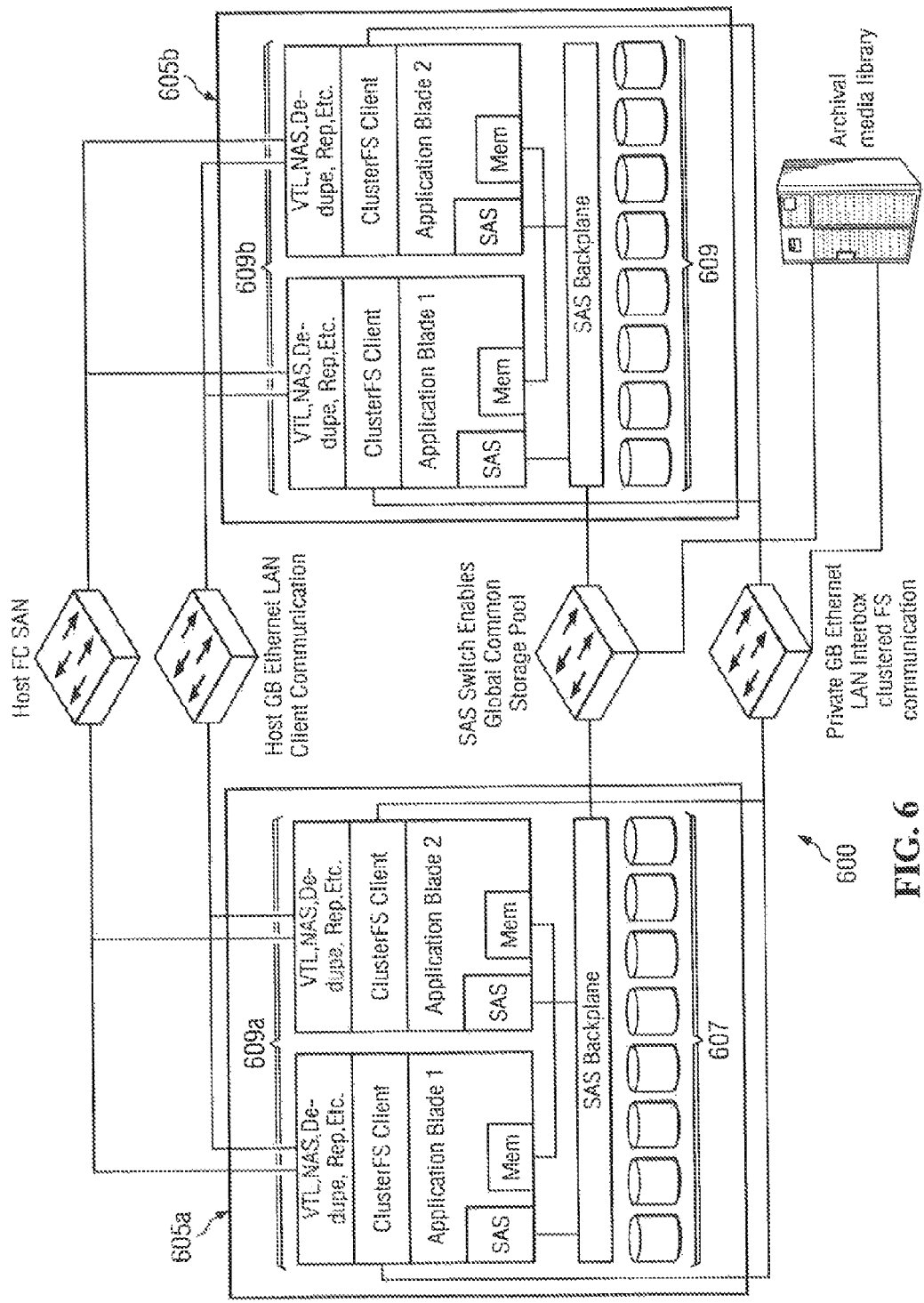

FIG. 6 illustrates an example implementation of RARN nodes in an example environment 600 according to one embodiment of the present invention. Referring now to FIG. 6, environment 600 includes two RARN nodes 605*a-b*. Each of the nodes 605*a-b* includes a plurality of storage devices 607 and 609 and pairs of application blades 609*a-b*. In one embodiment, two or more RARN nodes can be configured to share resources (e.g., SAS switch, Ethernet LAN, FC SAN) as shown in FIG. 6. Similar one or more systems 300, 400, and 500, each of the nodes 605*a-b* is configured to store parity or RAID data within each individual node.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this section prevails over the definition that is incorporated herein by reference.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A data storage apparatus comprising:
    one or more storage units;
    a first controller coupled to the storage units; and
    a second controller coupled to the storage units, the second controller being in communication with the first controller, the second controller being configured to:
        receive a request for storing a data set;
        generate parity data based on the data set; and
        store the parity data in at least one of the storage units;
    wherein the first and second controllers are Serial Attached Small Computer System Interface (SAS Redundant Array of Independent Disks (RAID) controllers, and the parity data are RAID parity data.

2. The data storage apparatus of claim 1, wherein the second controller is further configured to:
    write the data set to at least one of the storage units.

3. The data storage apparatus of claim 1, wherein the first and second controllers are coupled to the storage units via respective one or more switches.

4. The data storage apparatus of claim 3, wherein the switches are SAS switches.

5. The data storage apparatus of claim 4, wherein at least one of the SAS switches comprises a cluster initiator or target.

6. The data storage apparatus of claim 1, further comprising:
    a first motherboard coupled to the first controller; and
    a second motherboard coupled to the second controller.

7. The data storage apparatus of claim 1, further comprising:
    a first network interface coupled to the first controller; and
    a second network interface coupled to the second controller.

8. The data storage apparatus of claim 7, wherein the network interfaces are based on Ethernet or Fiber Channel network protocol.

9. The data storage apparatus of claim 7, wherein the first and second controllers are coupled to respective network interfaces via respective switches.

10. A method by a second controller in communication with a first controller, the method comprising:
    receiving a request for storing a data set;
    generating parity data based on the data set;
    storing the parity data in one or more storage units, the storing units being coupled to the first controller and the second controller respectively; and
    wherein the first and second controllers are Serial Attached Small Computer System Interface (SAS) Redundant Array of Independent Disks (RAID) controllers, and the parity data are RAID parity data.

11. The method of claim 10, further comprising:
    writing the data set to at least one of the storage units.

12. The method of claim 10, wherein the first and second controllers are coupled to the storage units via respective one or more switches.

13. The method of claim 12, wherein the switches are SAS switches.

14. The method of claim 13, wherein at least one of the SAS switches comprises a cluster initiator or target.

15. The method of claim 10, wherein:
    the first controller is coupled to a first motherboard; and
    the second controller is coupled to a second motherboard.

16. The method of claim 10, wherein:
    the first controller is coupled to a first network interface; and
    the second controller is coupled to a second network interface.

17. The method of claim 16, wherein the network interfaces are based on Ethernet or Fiber Channel network protocol.

18. The method of claim 16, wherein the first and second controllers are coupled to respective network interfaces via respective switches.

* * * * *